Dec. 10, 1968  W. BERTRAM, JR  3,415,175
DIFFERENTIAL CONTROL APPARATUS, ESPECIALLY FOR THE
ADJUSTMENT OF APERTURE OPENINGS IN
PHOTOGRAPHIC CAMERAS
Filed June 8, 1965  2 Sheets-Sheet 1
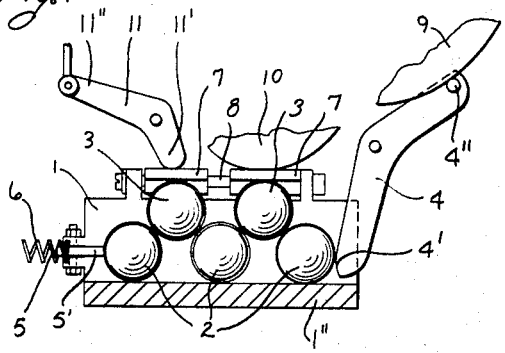
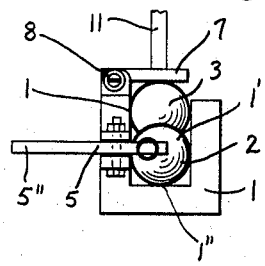
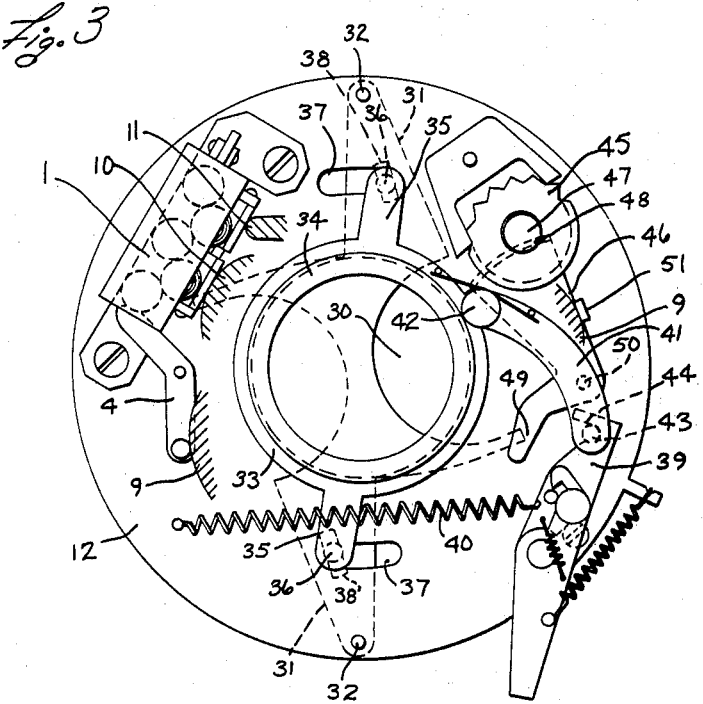
INVENTOR.
WILHELM BERTRAM, JR.
BY
Woodhams, Blanchard and Flynn
ATTORNEYS INVENTOR.
WILHELM BERTRAM, JR.
BY
Woodhams, Blanchard and Flynn
ATTORNEYS

United States Patent Office 3,415,175
Patented Dec. 10, 1968

3,415,175
DIFFERENTIAL CONTROL APPARATUS, ESPECIALLY FOR THE ADJUSTMENT OF APERTURE OPENINGS IN PHOTOGRAPHIC CAMERAS
Wilhelm Bertram, Jr., Munich-Grafelfing, Germany, assignor to Ernst and Wilhelm Bertram, Munich-Pasing, Germany
Filed June 8, 1965, Ser. No. 462,207
Claims priority, application Germany, June 11, 1964, B 77,209
25 Claims. (Cl. 95—64)

ABSTRACT OF THE DISCLOSURE

A differential apparatus for cameras for controlling one exposure influencing factor in relationship to a plurality of other exposure influencing factors, the apparatus being positionable between a movable driven member and at least two movable driving members. The apparatus includes a spacer means confined and movable between the driving and driven members and being in abutting contact therewith, the spacer means being confined and movable within a housing with the driving and driven members being substantially positioned exteriorly of the housing. The spacing means preferably includes a plurality of individual spacing elements, which elements are separate and free of positive connection with said driving and driven members.

---

This invention relates to a differential control apparatus in which a movable driven member is adjustable in relation to at least two movable driving members, especially for the control of one exposure influencing factor in relationship to other exposure influencing factors in photographic cameras, for example, for the control of the shutter in relationship to exposure time, brightness of the object and sensitivity of the film.

Differential devices have been known in the previous published art of which some are constructed as planetary devices and some are mechanisms utilizing levers. All these devices are complex in construction and the manufacture thereof is therefore expensive. Further, on account of the large number of expensive precision parts utilized in such apparatus, they are very prone to malfunctions. In addition, these differential devices require a relatively large amount of room so that in small hand-operated cameras such devices can be provided only with great difficulty and in some cases not at all.

The invention lies therefore in the provision of a simple mechanical differential apparatus capable of efficient manufacture which is strong and reliable in operation and can be built to occupy a minimum amount of space.

These objectives of the invention are attained by (1) the provision of a housing into which projects the externally operable driving means and out from which extends an internally operating driven means, wherein the movable apparatus comprising the driven means makes an angle with the movable apparatus comprising at least one driving means, (2) in the interior of the housing at least one spacer body lying on the contact surface of both the driving means and the driven means is related movably to one guide surface of the housing wall and/or contact surface of the driving and driven means, and (3) such means that adjustment of one driving means acts through a spacer body along at least one contact and/or guide surface to bring about an adjustment of the driven means. Use of a spacer body as a means for converting movement of the driving means to movement of the driven means has several advantages. A spacer body of this type is compactly built and reliable in its operation. Each spacer body lies in slideable and shiftable relationship against the surfaces of the housing surrounding same, the driving and driven means and the adjacent expanding bodies and is held in place and guided in its movement entirely by said surfaces. Complicated slides, guides or rotational linkage are not utilized. In this manner the construction of the differential apparatus becomes very simple, inexpensive and the resulting apparatus is effective in operation. Through appropriate choice of shape and number of the spacer bodies, one may reproduce a predetermined relationship between an independent driving force and dependent driven device in an analogue according to the differential apparatus of the invention. It is also possible to effect such an operation of a plurality of driving means from different directions onto a single spacer body in such manner that this spacer body, in consequence of its shape and the guiding between it and the surfaces of the driving and driven means lying thereagainst, converts a movement of each single driving means to the driven means independently of the position of the other driving means. It is therefore possible to utilize a single spacer body as means for converting several independent driving movements through a driven means whose final adjustment thus results from the number and size of independent movements. Since the spacer body can be manufactured in very small units, it is possible to build a differential apparatus according to the invention in a very small amount of space.

A very advantageous construction of the differential apparatus according to the invention can be provided where the spacer body is constructed as a ball. A ball lies on a surface theoretically at only one point. Practically, however, it occupies a very small area. It is therefore also on this surface relatively easily movable. Further, on account of this shape it is well adapted to have several driving means operating in different directions and arranged with contact surfaces lying on and operating with respect to driven means. A ball is also in small dimensions manufacturable very simply, cheaply and still with high precision.

A further worthwhile objective of the differential apparatus according to the invention is that the surfaces of the spacer bodies lying at the contact surfaces of the driving means and/or of the driven means are in a common plane. Spacer bodies with plane surfaces are especially appropriate as conversion means when the driven adjustment itself is the composite of the sum of individual adjustments wherein each individual adjustment is proportional to the adjustment of a particular driving means. Spacer bodies with plane surfaces are mechanically also manufacturable in a simple manner with minimum dimensions, said bodies lie easily adjacent to driving and driven means, adjacent the spacer bodies and the surfaces of the housing surrounding same and accordingly their movements are accurately guided.

An advantageous objective of a spacer body with planar surfaces is accomplished according to the invention when the spacer body is constructed as a prismatic body with a trapezoidal or triangular-shaped cross section. A spacer body of this type can, for example, be arranged with two surfaces defining an acute angle between the contact surfaces of a driving means and a driven means, whereby a second driving means operates in a direction perpendicular to the direction of movement of the first driven means with respect to a further surface of the prismatic expanding body. Spacer bodies of this type have the advantage that their movement under the influence of several adjusting devices engaging same and from different directions is very reliable in consequence of this simple geometric shape. There is therefore obtained an especially simple lineal relationship between the movement of the driving means and the adjustment of the driven apparatus. A very advantageous embodiment of the differential apparatus is thereby accomplished in that at least two extending bodies touching each other are serially arranged with respect to each other in a group extending in the direction of movement of the driven member. Through the use of several spacer bodies lying one on the other as translation means, it is possible to increase the number of driving means of the differential apparatus and thereby the number of operating controls. The advantage of the arrangement of the spacer bodies in a series group running in the direction of movement of the driven means will appear form the hereinafter following description.

A very advantageous embodiment of the differential apparatus will be obtained if the entire group of spacer bodies is arranged in the housing in a longitudinally slidable manner and positioned parallel wtih the direction of movement of the driven member or at least with a component of movement parallel therewith. In this manner it is possible to provide a supplemental driving means in the differential apparatus adjacent the driving means engaging the spacer bodies, said last-named driving means defining an angle with the direction of movement of the driven means. Said supplemental driving means in the direction of movement of the driven means displaces the entire group of spacer bodies simultaneously in this same direction. The greatest number of driving means in the differential apparatus theoretically possible with a given number of spacer bodies, is derived out out of the highest number of driving means per spacer body having a displacement direction operating at an angle to the direction of movement of the driven means which amounts to two, multiplied by the number of spacer bodies plus a further driving means for the shifting of the entire group of spacer bodies in the direction of movement of the driven means; the highest number of driving means which can be utilized amounts accordingly in this case to two times the number of spacer bodies plus one.

An advantageous further embodiment of the above-described differential apparatus according to the invention is obtained by providing with respect to each spacer body at the most only one driving means connected thereto, which latter is movable in the direction of movement of the driven means and thereby engages one of the driving means operating in the direction of movement of the driven means of the group. In this embodiment the construction of the differential apparatus becomes very clear. Each spacer body can be moved relative to the spacer bodies adjacent to it and lying on it and through at the most one driving means angularly arranged with respect to the direction of movement of the driven means. In this manner, the construction of the differential apparatus embodies the guiding of the expanding bodies and the arrangement of the driving means.

A further advantageous modification of the foregoing-described differential apparatus is obtained if all driving means and the driven means are so adjustably supported in the housing that the direction of movement of the contact surfaces lying on the spacer bodies extends in a single plane as further obtained if all spacer bodies are adjustably guided in the same plane in the housing. In this manner it is possible to arrange the spacer bodies between two parallel walls and to support the driving means and the driven means in this manner in the housing that their directions of movement are parallel with the middle plane between the two parallel walls. This provides a very simple construction and the guiding of the spacer bodies of the differential apparatus in a very simple manner.

A further desirable modification of the differential apparatus is obtained if each driving means, which is movable angularly with respect to the direction of movement of the driven means, has a contact surface which runs parallel to the direction of movement of the driven means. In this case, contact surfaces serve the driving means as guiding surfaces for movement of the spacer bodies in the direction of the driven means. Displacement of this kind can for example be obtained by pressing one spacer body between two adjacent expanding bodies in a direction perpendicular to the direction of movement of the driven means or by the displacement of the entire group of spacer bodies under the influence of a driving means with a direction of displacement parallel to the direction of movement of the driven means.

A very desirable further modification of the differential apparatus is obtained if at least one of the driven or driving means is spring urged in the direction of the spacer body lying thereon. In this manner it is made certain that the differential apparatus operates in a way corresponding not only to the increase in magnitude of force applied thereto but also corresponding to reduction in the value of such force. By a spring urging of the driven means it is, for example, possible not only to adjust the operation of the driving means in one direction but also to retract the driven means upon a retraction of the driving means in an opposite direction. By means of the return force of a spring of this type, it is also possible to locate the spacer bodies closely to each other and to the contact surfaces of the driving and driven means.

It is of great advantage if the differential apparatus according to the invention is so built that the movement mechanism of each driving and driven means is constructed in recognition of the shape of the actual spacer bodies and that between the operation of each driving mechanism and the operation of the driven means there is provided a desired, for example linear, relationship. By the selection of an appropriate actuation mechanism for each driving means, for example, through the control of the driving means by means of cams, one can cause a particular movement of a driving means to bring about in a manner corresponding to a previously determined function, a thereby controlled movement of the driven means. It is further possible to make lineal the operation of the spacer bodies which in consequence of their shape cause one movement of the driving means engaging same to be not lineally proportional to the movement of the driven means. Such apparatus is nevertheless simple and efficient to manufacture, for example, by balls through construction of an appropriate actuating mechanism for the driving means, for example a cam.

Further features of the invention will appear from the following description of illustrative examples by the use of differential apparatus for the control of camera closures and several further examples in the drawings.

FIGURE 1 shows the longitudinal section through the differential apparatus according to the invention for the control of the camera shutter.

FIGURE 2 shows a side view of the same differential apparatus.

FIGURE 3 shows a view of the differential apparatus in its position of use with a camera shutter.

Figure 4:
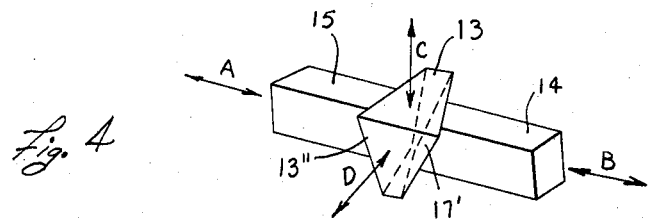
FIGURE 4 shows a schematic sketch of a second example of the differential apparatus according to the invention.

FIGURES 1-3 illustrate a first example of differential apparatus according to the invention for the control of a camera shutter. In a housing 1, there are five spacer bodies in the form of balls 2 and 3 arranged in a zig-zag manner with respect to each other lying between two parallel walls 1' of the housing 1 whose spacing is equal to the diameter of the balls; three balls 2 lie spaced from each other in a row on the base 1" of the housing 1. The two balls 2 each lie offset with respect to the row of three balls 2 and each lies on two of the balls 2. The trough-shaped housing 1 is open at both of its ends and at one lengthwise side. The two balls 3 extend outwardly of said housing at the open side of the housing 1 above the parallel side walls 1'. At one open end of the housing 1 there is provided a driving means 4 as an angle-shaped lever within the interior of the housing and lies with the free end 4' of its one arm at the end of the group of balls provided by the row of balls 2. At the other free end of the housing 1 there extends an arm 5' of a two-arm lever 5 into the interior of the housing and engages the one of the balls 2 constituting an end of the ball 2. The arm 5' of the two-arm lever 5 is pressed by a spring 6 inwardly of the housing 1 against the ball 2 lying thereagainst. The angled lever 4, constituting a driving means, together with the two-arm lever 5 constituting the driven means, are each pivotally mounted on the housing or on a part connected to the housing. In this way the pivotal position of the angled lever 4 and the two-arm lever 5 are so arranged that the free ends 4' and 5' of the levers 4 and 5 which respectively extend into the interior of the housing 1 are movable upon a displacement of the levers 4 and 5 parallel to the base 1" of the housing 1 and parallel to both of the walls 1'. At the side of each ball 3 projecting toward the open side of the housing 1 there lies a pivoted plate 7 having a contact surface extending substantially parallel to the bottom 1" of the housing 1. Both pivoted plates 7 are pivotally supported around an axis 8 which is parallel to the wall 1' and to the bottom 1" of the housing 1, said axis being arranged adjacent the open side of the housing 1 on a side wall thereof. The direction of movement of the plates 7 on swinging thereof around the axis 8 is essentially perpendicular to the bottom 1" of the housing 1 and thereby perpendicular to the direction of displacement of the free end 4' of the angled lever 4 which engages a ball 2 and also perpendicular to the direction of displacement of the free end 5' of the two-arm lever 5 which engages another ball 2. Each plate 7 constitutes one driving means operating on one ball 3 with a direction of movement perpendicular to the direction of movement of the driven means.

Thus, this embodiment of differential apparatus according to the invention comprises three driving means and a driven means. One driving means, namely the angled lever 4, operates for displacement of the ball group 2 in a direction parallel to the direction of movement of the driven means and of the two-armed lever 5. Two driving means, the two plates 7, operate on the respective balls 3 in a direction of displacement perpendicular to the direction of movement of the driven means.

The foregoing-described differential apparatus serves for the control of a camera shutter, especially for the control of either the iris opening or the shutter time in relationship to the film sensitivity, lens sensitivity and relationship of shutter time to iris opening. For this purpose there is provided an actuating means for each driving means and there is provided driven means to which the value of the magnitude of available illumination can be supplied into the differential apparatus. At the end 4" of the angled lever 4 there is arranged a cam 9 which rides on a pin fastened at the end 4" and by its rotation it swings angled lever 4. In this manner, the rotative movement of the cam 9, which is rotatably mounted in the shutter housing, becomes converted into a displacement movement of the end 4" of the angled lever 4 lying adjacent the walls 2, said movement of said end 4' being parallel to the base 1" of the housing 1. The cam 9 is connected with the shutter mechanism for the selection of the exposure time for the actuation of the camera shutter.

Shutter mechanism is illustrated in FIGURE 3. Shutter plates 31 are mounted movably around fiixed pins 32 on a base plate 12 with a central light opening 3 therein. For the pivotal movement of the shutter plate 31 there is provided a driving ring 33 which is rotatably mounted on tubular member 34 surrounding the aperture 30. The driving ring 33 has diametrically oppositely lying arms 35 fastened thereto and carry bolts 36 fastened thereto and projecting through the slots 37 in the base plate 12. Said arms 35 engage the bolts 36 in the slits 38 of the shutter plates 31. For the rotation of the driving ring 33, there is provided a lever mechanism which includes the self-tensioning driving lever 39 mounted movably on a rotational axis located on the base plate 12, said drive lever 9 being tensioned by a spring 40 which with one end engages the lever 39 and with the other end the base plate 12. The drive lever 39 constitutes, together with a pivoted lever 41, a jointed lever. The lever 41 is pivotally mounted at 42 on the drive ring 33 and carries at one end a pivot pin 43 which cooperates with the recess 44 at the adjacent end of the driving lever 39. In FIGURE 3 there is shown a lever in its cocked position wherein the jointed pair 39, 41 is in its outwardly bent position. Upon releasing of the shutter, the spring 40 drives jointed lever through a straight position and into an inwardly bent position whereby by the means of the driving ring 33 the shutter plates 31 first swing away from each other for the opening of the aperture 30 and then again swing together. The very short exposure time thereby provided is determined by the strength of the drive spring 40. For the obtaining of a longer exposure time, any well-known retarding device may be positioned on the base plate 12. Such a retarding device here consists of a restricting wheel 45 and a pinion 46 cooperating therewith. Coaxially with the restricting wheel 45 there is provided the pinion 47 with which a gear segment 48 engages as a driving part of the retarding apparatus. The gear segment 48 has an arm 49 and is mounted pivotally on an axis 50. The arm 49 can be moved inwardly into the path followed by the jointed-lever-pin 43 when it moves inwardly in response to inward movement of the center jointed lever. The location of the cam 9 determines the position of the arm 49, the same being rotatably mounted on the base plate 12, said cam having a projecting nose 51 therein which controls the position of the tooth segment and thereby of the arm 49. The nearer the arm 49 lies to the outermost position of the pin 43 the longer the movement of the jointed lever is retarded by the retarding apparatus 45, 46 and conversely. In such manner, there is obtained in a very simple manner the various desired time periods of shutter opening.

Upon the rotation and location of the cam 9 there is controlled not only the retarding mechanism 45, 46 of the shutter for a desired exposure time but simultaneously the angled lever 4 of the differential apparatus, which at its other end lies on one part of the cam 9, becomes pivoted through a corresponding amount.

In this manner, the end 4' of the angled lever 4, which projects into the interior of the housing, is displaced in an amount corresponding to the selected exposure time so that the entire ball group, consisting of the balls 2 and 3, are moved in the housing 1 a corresponding amount parallel to the base 1" of the housing 1. At the outer side of the pivoted plates 7, there lies the end of the arm 11' of a two-armed lever 11 which is arranged pivotally around an axis on a part of the camera shutter fixed to the housing 1. The other arm 11" of the lever 11 is coupled with a selection apparatus for the selection of film sensitivity. By the selection of a particular film sensitivity the lever 11 is rotated a predetermined amount. The arm 11' of the lever 11 converts this rotative movement into a displacement movement of the plate 7 associated with the balls 3. The balls 3 lying on the plate 7 are thereby displaced perpendicularly to the base 1" of the housing 1 and thereby are either pressed further between the two balls 2 lying thereon or urged further outwardly with respect to them. In this manner, the spacing of the balls 2 lying on the balls 3 is suitably altered. This spacing change effects the lengthening or a shortening of the entire length of the ball group consisting of the balls 2 and 3 which effects a displacement of the lever 5 of the driven mechanism, said lever 5 being urged by the spring 6.

At the upper side of the second plate 7 there lies a cam 10 with its edge slidingly bearing thereagainst. The cam 10 is rotatably mounted on a suitable axis (not shown) on a part of the camera shutter connected to the housing 1. It is coupled with the actuating mechanism for the selection of the shutter opening of the camera. Upon the adjustment of the shutter opening, the cam 10 is rotated a desired amount. Thereupon the plate 7 lying on the cam 10 is similarly moved a desired distance in a direction running essentially perpendicular to the base 1″ of the housing 1. This movement is transmitted to the ball 3 lying underneath the plate 7. Movement of this ball 3 operates similarly for the alteration of the entire length of the ball group. This alteration in such length acts as before for the adjustment of the lever 5 in response to the pressure of the spring 6, namely, for adjustment of the driven means. If desired, the arm 5″ of the two-arm lever 5 may be connected to an actual value indicator of an exposure meter. The setting of the camera shutter is now determined first, according to the known value of the film sensitivity, by means of the lever 11 and the plate 7 of the differential apparatus. Next, the exposure time is selected and, by the cam 9 and the valve crank 4, similarly fed into the differential apparatus. Lastly, the iris opening is determined and the value for the iris opening, applied by the cam 10 and the plate 7 lying thereon, is introduced into the differential mechanism. The shutter opening is thereby altered, and the value for the shutter opening introduced into the differential mechanism by the cam 10 and the plate 7 modified, until the actual value setting, that is, the position of the lever 5, obtained from the film sensitivity, exposure time and shutter opening coincides with a theoretical value setting shown by the exposure meter coupled to the apparatus through the lever 5. The exposure meter coupled or connected to the lever 5 can, for example, have two indicators of which one shows film sensitivity exposure time and shutter opening dependent upon the illumination of the object and of which the other is coupled with the lever 5 of the mechanical differential mechanism. It is also possible, upon the setting of the camera shutter, with the help of the differential mechanism according to the invention, to preselect the film sensitivity and shutter opening as a fixed value and to alter the exposure time continuously with simultaneous reference to the exposure meter connected to the driven means of the differential mechanism until the desired actual value indicator in the exposure meter coincides with said fixed value. In the differential apparatus of the invention above described, there are only the two balls 3 adjustable in a direction perpendicular to the direction of movement of the driven means and also parallel to the direction movement of the driven means. Each of the balls 3 lies between two of the balls 2 lying on the base 1″ of the housing 1 which latter are only movable parallel to the direction of movement of the driven means. An adjustment of one particular ball 3 in a direction perpendicular to the base 1″ of the housing 1 accordingly always brings about a change in spacing of the balls 2 lying directly against this particular ball 3 which is independent of the spacing of the remaining balls 2 which do not contact the one of the balls 3 so moved. The amount of displacement of the driven means, that is, the lever 5, consists accordingly in this differential mechanism always as the sum of the movement of the several parts which is the result of the displacement of the ball 3 by the angular lever 11, of the ball 3 actuated by the cam 10 and of the ball 2 actuated by the angular lever 4. For the actuation of the balls 2 and 3 operating as an expansion means in the housing 1 the parallel side walls 1′ and the bottom 1″ of the housing 1 also serve, together with the underside of the plate 4 lying on the ball 3, as guide surfaces for directing the movement of the balls in the direction of movement of the driven means. In the described differential apparatus it is obviously possible to interchange the functions of the driving and driven means.

It is apparent from FIGURE 3 that the differential mechanism as described has small dimensions and consequently requires only very little room for building same into the camera shutter.

Through appropriate shaping of the cams 9 and 10 and the actuating mechanism for the angle lever 11, a linear relationship can be obtained between the movement of the actuating mechanism for the cams 9 and 10 and the angle lever 11 and the displacement of the driven means, even though the balls because of their shape do not themselves have a linear relationship as an expanding medium.

A second example of the differential apparatus according to the invention is illustrated in principle in FIGURE 4. A spacer member 13 is arranged between the driving means 14 and driven means 15. The spacer body 13 is bounded by planar surfaces. In this manner, the side surfaces of the spacer body 13 which lie on the contact surfaces of the drive means 14 and the driven means 15 are so sloped with respect to each other that the spacer body acts as a wedge in two directions which are perpendicular with respect to each other and to the common direction of movement of the driving member 14 and the driven member 15. Two further driving means can therefore engage the spacer body 13, the direction of movement of said driving means being perpendicular with respect to each other and with respect to the direction of movement of the driven means 15 (see the double arrows C and D in FIGURE 4). In this manner, it is possible through a single spacer body 13 to convert three independent driving movements occurring in the directions of the double arrows B, D and C to a driven movement in the direction of the double arrow A.

It is obvious that the entire system shown in FIGURE 4 including driving means, driven means and a spacer body must be supported in a suitable housing. In this connection, it is very advantageous to apply at least one driving or driven means through a spring onto the spacer body 13 in order to make possible a reversal of the direction of movement of the differential apparatus.

Figure 5:
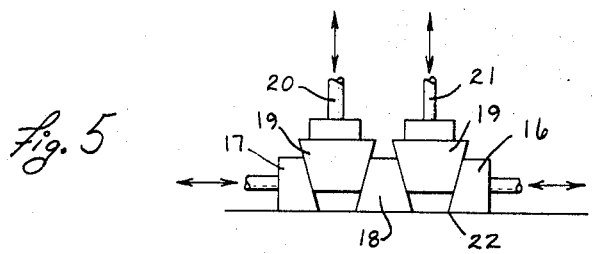
FIGURE 5 shows a schematic sketch for a third embodiment of the differential apparatus of the invention.

A third embodiment of the differential apparatus according to the invention is illustrated schematically in FIGURE 5. Between one driven means 17 and a driving means 16, whose directions of movement are the same, there are arranged three prismatic spacer bodies with trapezoidal cross sections, so positioned that the lengthwise axes of the prisms extend parallel to each other and perpendicular to the direction of movement of the driven means. A prism 18, whose wider side lies on a glide surface 22 of a housing, is also provided lying closely between two prisms 19, said latter being positioned with their broad sides facing away from the glide surface 22. On each prism 19 there is supported on its broader side, respectively, the driving means 20 and 21, said driving means being adjustable perpendicularly with respect to the direction of movement of the driven means 17. This differential apparatus works in essentially the same manner as the first above-described differential apparatus, only it provides through the planar side surfaces of the spacer bodies 18–19 lying against each other a proportional relationship between the movement of a particular driving means and the movement of the driven means 17. The spacer body 18 is movable only in the direction of movement of the driven means 17 while the expansion body 19 is movable also in the direction perpendicular thereto.

Figure 6:
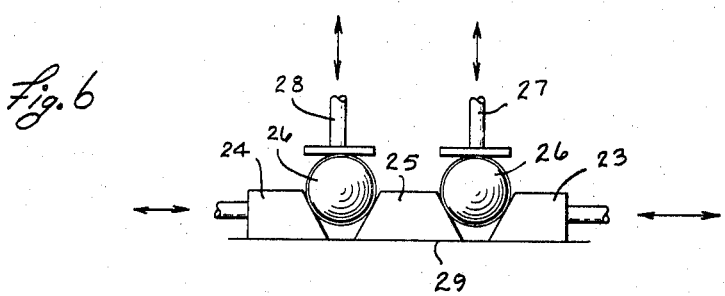
FIGURE 6 shows a schematic sketch for a fourth embodiment of the differential apparatus according to the invention.

A fourth embodiment of the invention is illustrated in FIGURE 6. A prismatic spacer body 25 with the trapezoidal cross section is arranged with its wider side on the sliding surface 29 and is positioned between a driven member 24 and a driving member 23 whose direction of movement extends similarly and parallel to the slide surface 29. The contact surfaces of the driven means 24 and the spacer body 25 as well as the driving means 23 and the spacer body 25 extend angularly upwardly and the spacer balls 26 lie on and between the drive means 23, spacer body 25 and the driven means 24 and do not contact the slide surface 29. Drive means 27 and 28 engage each of the balls 26 on the sides thereof remote from the slide surface 29, said drive means having a direction of adjustment perpendicular to the direction of movement of the driven means 24. The driving means 27 and 28 have contact surfaces which extend parallel to the slide surface 29 and serve as pressure surfaces for the adjustment of the balls perpendicularly to the direction of movement of the driven means as well as serving to guide the balls in a displacement in the direction of movement of the driven means.

The manner of operation of this differential apparatus is analogous to the manner of operation of the differential apparatus of the first-above-described embodiment. Since, however, in this embodiment the balls 26 do not lie directly against other balls but instead on smooth surfaces there is in this case similar to the third-above-described embodiment provided a possibility for proportional relationship between the adjustment of a given driving means and the corresponding adjustment of the driven means 24. The balls 26 of the fourth-illustrated embodiment have a lesser glide friction and are simpler to manufacture than the prismatic spacer bodies 19 of the third example.

It is also possible to construct the differential apparatus of the invention in such a manner that the driving and driven means related thereto are not arranged as a lever or pusher but as a row of balls arranged at the end of the ball groups provided in a manner analogous to the first embodiment. These balls can be guided in tube-like channels which also can be bent. In this manner it is possible to manipulate in a simple manner the operating mechanism of an adjustment device in the desired direction of adjustment of a driving means.

The features described and illustrated in the foregoing description and drawings, including construction details, can be arranged in various other desired combinations within the scope of the invention.

The embodiments of the invention in which an exclusive property or privilege is claimed are defined as follows:

1. A differential apparatus for controlling an exposure influencing factor in dependency on other exposure influencing factors in a photographic camera, said apparatus being positionable between a movable driven member and at least two driving members, the direction of movement of said driven member being at an angle with respect to the direction of movement of at least one of said driving members, comprising:

a housing mountable on said camera, at least one of said driving members and said driven member being positioned adjacent the external periphery of the housing and being adapted to extend into said housing with said driving members being actuated externally of said housing;

spacer means positioned within said housing for transmitting movement from said driving members to said driven member, said spacer means being free of positive connection with said driving and driven members so as to be only in abutting contact with said driving and driven members;

said spacer means including at least one spacing element with said element being separate from said driving and driven members, said spacing element being in abutting contact with at least one of said driving members whereby movement of said one driving member causes a corresponding movement of said spacing element and said driven member.

2. A differential apparatus as defined in claim 1, wherein the housing has guide surfaces for confining the spacing element for movement substantially within a single plane.

3. A differential apparatus as defined in claim 1, wherein said spacer means includes a plurality of separate spacing elements, and wherein each of said driving and driven members is provided with a contact surface thereon with one of said spacing elements being in abutting contact with each of said contact surfaces, the contact surfaces of said driving and driven members confining and positioning said spacing elements therebetween for guiding the movement thereof.

4. A differential apparatus as defined in claim 1, wherein said spacer means includes a plurality of separate spacing elements in the form of balls.

5. A differential apparatus as defined in claim 1, wherein said spacer means includes at least one spacing element having substantially planar contact surfaces thereon.

6. A differential apparatus as defined in claim 1, wherein said spacer means includes at least two spacing elements arranged in a row extending substantially in the direction of movement of the driven member.

7. A differential apparatus as defined in claim 1, wherein said spacer means includes a plurality of spacing elements arranged in a group within said housing, said driven member being positioned adjacent one end of said group of spacing elements and one of said driving members being arranged adjacent the other end of said group of spacing elements remote from said driven member, said last-mentioned driving member being movable lengthwise of said housing and having a component of movement in a direction substantially parallel to the movement of said driven member.

8. A differential apparatus as defined in claim 1, wherein said spacer means includes a plurality of spacing elements with each of said driving and driven members being abuttingly contacted by only a single spacing element, one of said driving members being movable in a direction extending angularly relative to the direction of movement of said driven member, the other driving member being movable in a direction substantially aligned with the direction of movement of said driven member.

9. A differential apparatus as defined in claim 1, wherein spacer means includes a plurality of spacing elements with each of said driving and driven members being contacted by at least one of said spacing elements, said spacing elements and said driving and driven members defining a plurality of contact points therebetween with said contact points on said driving and driven members lying substantially within a single plane, said plurality of spacing elements being confined by said housing so as to be movable only within said single plane.

10. A differential apparatus as defined in claim 1, wherein said one driving member which is movable at an angle to the direction of movement of said driven member has a contact surface adapted to be abuttingly contacted by said spacing element, said contact surface extending substantially parallel to the direction of movement of said driven member.

11. A differential apparatus as defined in claim 1, wherein said spacer means includes at least three spacing elements in the form of balls, said balls being positioned within the housing, two of said balls being aligned substantially behind one another in the direction of movement of said driven member, the third ball being laterally offset with respect to the alignment of the other two balls and being arranged therebetween, said two balls being confined by said housing so as to be movable solely in the direction of movement of said driven members, said third ball being in abutting contact with said one driving member for movement in a direction substantially transverse to the direction of movement of said driven member for urging said third ball into engagement with and between said two balls.

12. A differential apparatus as defined in claim 1, wherein spring means coacts with one of said driving and driven members for urging same into abutting contact with said spacer means.

13. A differential apparatus as defined in claim 1, wherein said spacing element is in abutting contact with at least two driving members, said two driving members and said driven member all having a direction of movement extending at an angle with respect to each other.

14. A differential apparatus as defined in claim 1, wherein said spacing element comprises a prismatic body of polygonal cross section having at least three substantially straight sides.

15. A differential apparatus as defined in claim 14, wherein said spacer means includes a plurality of spacing elements with at least some of said elements having a trapezoidal cross section.

16. A differential apparatus as defined in claim 1, wherein said spacer means includes at least three prismatic spacing elements with said spacing elements being of a polygonal cross section having at least three substantially straight sides, the longitudinal axes of said prismatic spacing elements being substantially parallel to one another and extending in a direction substantially transverse to the direction of movement of said driven member, two of said spacing elements being positioned adjacent one another substantially in the direction of movement of said driven member and said third spacing element being positioned between said other two spacing elements, said third spacing element having two sloping surfaces thereon in abutting contact with similar sloping surfaces formed on said two first-named spacing elements with said two first-named spacing elements being movable solely in a direction substantially parallel to the direction of movement of said driven member, said third spacing element being contacted and moved by said one driving member for movement in a direction substantially transverse to the direction of movement of said driven member with said third spacing element being urged between said two first-named spacing elements.

17. A differential apparatus as defined in claim 16, wherein said prismatic spacing elements have a trapezoidal cross section.

18. A differential apparatus as defined in claim 1, wherein said spacer means includes a plurality of prismatic spacing elements of polygonal cross section having at least three straight sides, said prismatic spacing elements being positioned adjacent one another within said housing so as to form a row extending substantially in the direction of movement of said driven member, the longitudinal axes of said prismatic spacing elements extending substantially parallel to one another and substantially transverse to the direction of movement of said driven member, said spacer means further including at least one spacing element formed as a ball with said ball being positioned between and in abutting contact with two adjacent prismatic spacing elements, said ball being urged by said one driving member in a direction substantially transverse to the direction of movement of said driven member whereby said ball is urged between the prismatic spacing elements contacting same, said prismatic spacing elements being movable solely in a direction substantially parallel to the direction of movement of said driven member.

19. A differential apparatus as defined in claim 18, wherein said spacing means includes a plurality of balls with said balls being alternately arranged between adjacent prismatic spacing elements, each of said balls being contacted and independently moved by a separate driving member for movement in a direction substantially transverse to the direction of movement of said driven member, said prismatic spacing elements having a substantially trapezoidal cross section.

20. A differential apparatus as defined in claim 1, wherein said spacer means includes at least five spacing elements in the form of balls, said balls being confined and arranged with respect to each other by said housing in a substantially planar zig-zag pattern, three of said balls contacting a wall of said housing and being aligned in a row extending substantially in the direction of movement of said driven member and being movable only in this direction, two other balls being laterally offset with respect to said row and each being respectively arranged between two adjacent balls of the first-named three balls, one of said last-named two balls being in abutting contact with one of said driving members for movement in a direction substantially transverse to the direction of movement of said driven member, said last-named two balls both being movable in the direction of movement of the driven member as well as in a direction substantially transverse thereto with said last-named two balls being urged between the first-named three balls so as to cause a corresponding adjustment in the position of said driven member.

21. A differential apparatus as defined in claim 20, wherein said two driving members comprise flaps pivotally mounted on said housing with each of said flaps being adapted to abuttingly contact one of said last-named two balls, each of said flaps being operably connected to and the position thereof controlled by independent exposure control mechanisms.

22. A differential apparatus for a photographic camera, comprising:
  elongated channel-shaped housing means having a bottom wall and a pair of laterally spaced sidewalls;
  a driven member positioned adjacent one end of said housing means for movement in a direction substantially parallel to the elongated direction of said housing means;
  a first driving member positioned adjacent said housing means and spaced from said driven member, said first driving member being movable in a direction of movement extending at an angle with respect to the direction of movement of said driven member;
  a second driving member positioned adjacent said housing with said second driving member being spaced from said first driving member and said driven member;
  spacer means positioned within said housing means in abutting contact with said first and second driving members and said driven member for transmitting the movement of said first and second driving members to said driven member, said spacer means including a plurality of separate and independent spacing elements with said driving and driven members each being in abutting contact with at least one of said spacer elements, said spacing elements being in abutting contact and being free of positive connection with the driving and driven members.

23. A differential apparatus for a camera having a driven member and first and second driving members, one of said driving members having a direction of movement which is angularly inclined with respect to the direction of movement of said driven member, comprising:
  an elongated housing mountable on said camera and having a base wall and a pair of laterally spaced sidewalls;
  spacer means positioned within said housing and adapted to abuttingly contact said first and second driving members and said driven member for transmitting movement from said driving members to said driven member, said spacer means being free of positive connection with said driving and driven members;
  said spacer means including at least three separate and independent spacing elements positioned between the sidewalls of said housing with said driving and driven members each being adapted to abuttingly contact at least one of said spacing elements, one of said spacing elements being positioned adjacent to and substantially between the other two spacing elements and in abutting contact therewith;
  at least one of said three spacing elements being in contact with the base wall of said housing and being movable solely in the direction of movement of said driven member, another of said three spacing elements being movable both in a direction substantially transverse to and substantially parallel to the direction of movement of said driven member.

24. A differential apparatus as defined in claim 23, wherein said camera has a third driving member with said spacer means being adapted to abuttingly contact same for transmitting movement therefrom to said driven member, said spacer means having a spacing element adapted to abuttingly contact said third driving member.

25. A shutter control apparatus for a photographic camera, having an exposure meter thereon, comprising:
   first control linkage means for adjusting the exposure time of the shutter, said linkage means having a first movable driving member with the position thereof being determined by the selected exposure time;
   a second control linkage for adjusting the shutter in accordance with the film sensitivity, said linkage means including a second movable driving member with the position thereof being determined by the selected film sensitivity;
   a third control linkage means for adjusting the shutter in accordance with the object brightness, said linkage means including a third movable driving member with the position thereof being determined in accordance with the illumination of the object to be photographed;
   driven control link means operably coupled with the exposure meter and including a movable driven member operatively interconnected to and movable in response to movement of either or all of said first, second and third driving members;
   differential transmission means interconnected between said first, second and third control linkage means and said driven control link means for transmitting movement from either or all of said driving members to said driven member;
   said differential transmission means including a housing detachably mounted on said camera and including spacer means positioned within said housing for transmitting movement from said driving members to said driven members, said spacer means including a plurality of separate and independent spacer elements with each of said driving and driven members being in abutting contact with at least one of said spacing elements, said spacing elements being free of positive connection with said driving and driven elements whereby said differential transmission means including said housing with said spacer means positioned therein can be removed from the camera as a unit.

References Cited

UNITED STATES PATENTS

| 2,610,614 | 9/1952 | Sedgwick. | |
| 2,917,984 | 12/1959 | Faulhaber | 95—64 |
| 2,929,307 | 3/1960 | Trum et al. | 95—64 |

NORTON ANSHER, *Primary Examiner.*

JOSEPH F. PETERS, *Assistant Examiner.*

U.S. Cl. X.R.

74—479